Figures 1, 2:
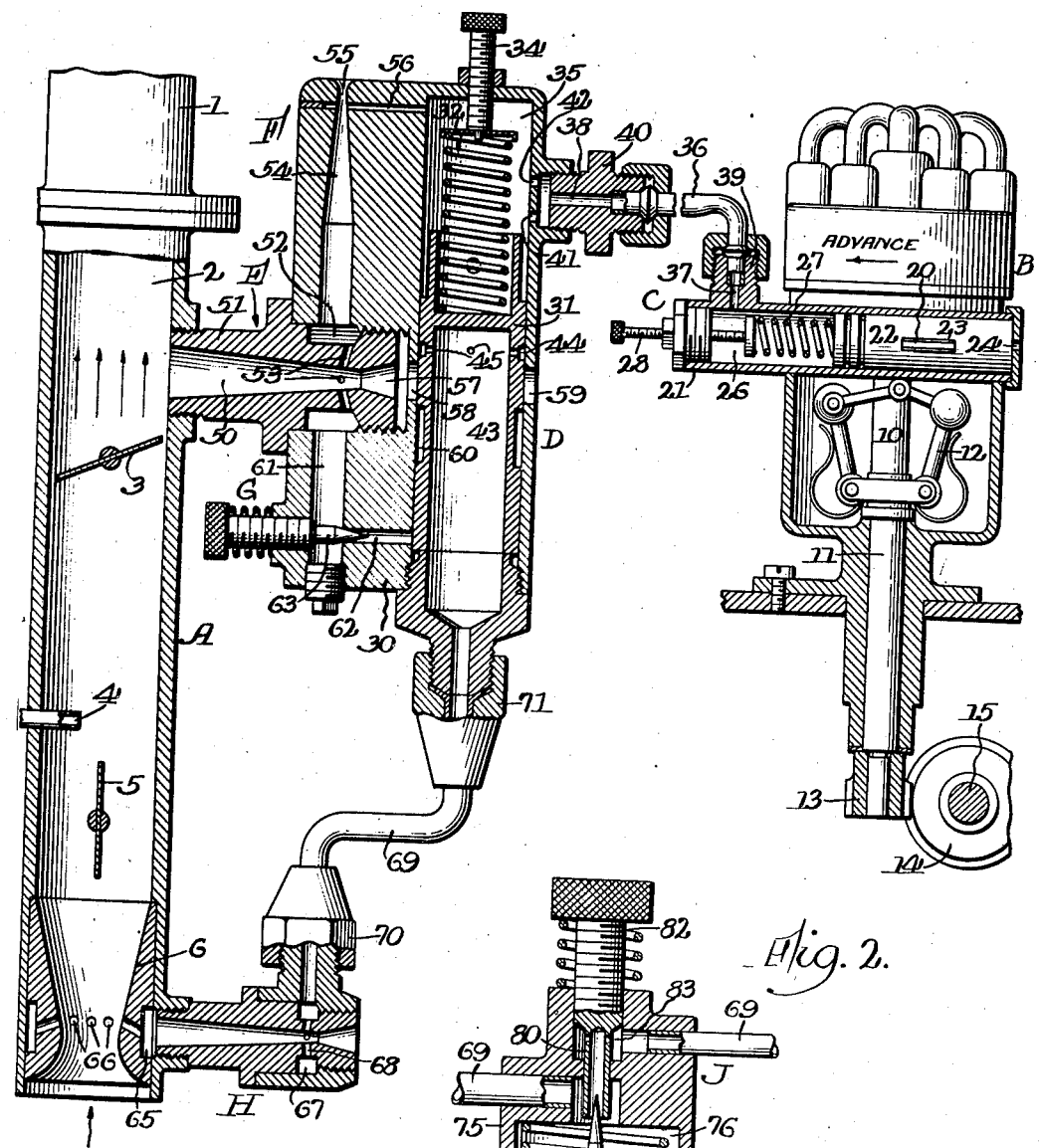

Patented Sept. 21, 1937

2,093,524

UNITED STATES PATENT OFFICE 2,093,524

AUTOMATIC IGNITION CONTROL FOR INTERNAL COMBUSTION MOTORS

Harold W. Meade, Covington, Ind.

Application October 20, 1934, Serial No. 749,213

20 Claims. (Cl. 123—117)

My invention relates to improvements in automatic ignition control mechanisms for internal combustion motors.

The object of my invention is to provide a device which will give additional advance of the spark under part throttle and light load conditions as such loads decrease, and at the same time advance the spark sufficiently for full load conditions.

While my device if desired may be used in combination with a speed controlled governor which advances the spark as the speed increases, it is an object of my invention to eliminate all engine driven devices, such as centrifugal governors, which govern the advance of the spark by the increase in the speed of the engine. Instead, my object is to provide a device which will advance the spark in response to the increase in the quantity of explosive mixture supplied to the engine.

Automatic ignition controllers which advance the timing of the ignition jointly, in accordance with the speed of the engine and the load thereon, as determined by the vacuum in the intake passage between the engine and the throttle, are well known. Such joint control of the ignition timing is imperfect since the vacuum in the said intake passage, with the throttle at a given fractional capacity, is neither representative of the quantity of explosive mixture being supplied to the engine, nor does it indicate the exact value of compression of the charge within the cylinder. Furthermore, the vacuum between the engine and the throttle at idling or low engine speed is excessive compared to that existing at maximum engine speed under full throttle.

It is an object of my invention to provide means whereby the effect of the excessively high vacuum, occurring during idling conditions, will advance the spark in a similar ratio to that which occurs as result of the low vacuum conditions of full throttle and normal load.

Another object of my invention is to provide means whereby the increment of spark advance is increased as the volumetric efficiency of explosive mixture being supplied to the engine decreases within the intake passage.

A further object of my invention is to provide means for retarding the spark under light load conditions at low speed, without retarding the spark under similar load conditions at a higher speed.

Further it is my object to produce such a spark control device which is free from mechanical connection with any moving part of the carburetor or associated mechanism.

Other objects of the present invention reside in certain details which will be pointed out in more detail in the accompanying specifications, shown in the drawing, and more particularly set forth in the appended claims.

In the drawing,

Fig. 1 shows the intake conduit of an internal combustion engine with my invention applied thereto, certain parts being in section; and Fig. 2 is a detail view of a pressure controlled metering valve which may be used to modify the effect of the pressure generated between the engine and the throttle.

Referring in more detail to the drawing, 1 represents the manifold of an internal combustion engine to which the air sleeve 2 of the usual carburetor A is connected. The fuel enters the air stream in the sleeve 2 through fuel jet 4 from whence it is conducted to the engine.

The air sleeve 2 of the carburetor, which may be of any desired type, is provided with the usual throttle 3, a choke-valve 5, and a constriction or flow-impeding means such as a venturi 6 through which air enters the air sleeve. The constriction or flow-impeding means, however, may be of any suitable form for the purpose. While the preferable carburetor arrangement is to provide the air sleeve 2 with the choke-valve 5 between the throttle 3 and the flow-impeding means 6, this arrangement is not necessary for the purposes of my invention. Instead, the choke-valve may be placed on the atmospheric or intake side of the flow-impeding means if desired.

The timer or spark positioning device B may be of the usual or any suitable type for the purpose, and my invention is not concerned with the details of the timer as such. I have shown conventionally a well-known form of timer including a centrifugal governor which advances the spark in response to engine speed increases. This consists of a spindle 10 in line with spindle 11, said spindles being connected by a centrifugal device 12 whereby rotation of spindle 11 drives the spindle 10. These spindles rotate synchronously with each other, except that the angular relation between the spindles changes with variations in the speed of rotation, so that an increase in speed advances the spark, and vice versa, as indicated by the arrow on the distributor cap. The spindle 11 is driven by the engine in any suitable manner, such as a pair of meshing spiral gears 13 and 14, from the camshaft 15.

The timer also usually has means by which it is connected to a control device. In the present structure this is represented by a lever 20 which, when moved to the left as shown in the drawing, advances the spark position, and when moved to the right retards the spark position. In the drawing, the control or actuating device C comprises a cylinder 21 in which a piston 22 is movable. The lever 20 is connected to the piston by extending it through a slot in the cylinder wall and a slot 23 in the piston.

The piston is reciprocable in the cylinder and is responsive to vacuum pressure condition established in the cylinder, as hereinafter explained. The one end of the cylinder is open to the atmosphere through the opening 24. The other end is closed and forms a chamber 26. A spring 27 bears against the piston and opposes its movement in response to the vacuum condition in the cylinder, and this action of the spring is adjustable by means of the screw 28.

In accordance with my invention, I connect between the carburetor A and the spark actuator B, a control means which includes generally, an idling controller D, aspirators E and F, and a metering valve G. These parts may, for the purposes of manufacture, be arranged in a single unitary structure which includes a casing 30.

The idling controller includes a cylinder formed within the casing, and a cylindrical valve member 31 movable therein which is acted upon or loaded by means of a spring 32 positioned between the end of the valve member and an adjusting screw 34 which is provided for adjusting the responsiveness of the valve member. The chamber 35 of the cylinder above the valve is connected to the cylinder chamber 26 of the spark control device B by means of a tube 36 and passages 37 and 38 in the couplings 39 and 40 respectively, for said tube. Communication between the passage 38 and the cylinder chamber 35 is formed by two ports 41 and 42 spaced apart in the wall of the cylinder, these ports being controlled by the valve member 31 when in its upper position in the cylinder. On the way up, the valve first covers port 41 and then 42, but just as it is covering port 42, it opens port 41 to communication with the cylinder chamber 43 below the valve member. This is accomplished by the annular groove 44 in the valve, which is positioned to register with said port 41. This groove communicates with chamber 43 through the ports 45 in the valve wall.

The aspirators E and F are in the form of a venturi. The venturi 50 is formed in a plug 51 which is screwed into the casing 30 at one end and into the carburetor sleeve 2 at its other end at a point between the throttle 3 and the engine manifold. An annular chamber 52 is formed on the exterior of the plug and preferably communicates with the throat of the venturi by the passages 53 at a point on the downstream side of maximum restriction of the throat of said venturi. This exact structure is preferable in all of the aspirators referred to in this specification.

The intermediate aspirator F likewise is a venturi 54 formed in the casing and communicating at its discharge end with the annular chamber 52. Its intake end 55 communicates with the outside atmosphere, and its throat communicates with the chamber 35 through passage 56. The maximum area of the throat of venturi 54 is preferably about one-fourth the combined area of the passages 53 communicating with the throat of venturi 50.

The intake end 57 of venturi 50 communicates with a port 58 in the wall of the casing 30, and aligned with this port 58 is a port 59 in the wall of the casing leading directly to the outside atmosphere. The valve member 31 of the idling controller has an annular groove 60 which in certain position of the valve registers with the ports 58 and 59 and thereby connects aspirator E directly with the outside atmosphere.

The metering valve G includes two passages 61 and 62 formed in the casing and communicating respectively with the annular chamber 52 of aspirator E and chamber 43 of the idling controller cylinder. A needle valve 63 controls the flow of air through the passages and is adjustable for very accurate adjustment. The lower end of the idling valve member 31, in lower position, closes the passage 62, but when it moves upwardly it uncovers said passage and opens communication thereof with the chamber 43 of the idling controller.

The flow-impeding device 6 of the carburetor is formed as a Venturi aspirator and is provided with an annular chamber 65 which is in communication with the throat of the venturi through the passages 66.

Another aspirator H has its discharge end in communication with the chamber 65 and its intake end open to the atmosphere. This aspirator H has its annular chamber 67 connected by passages 68 to the throat of the venturi, and is also connected to the lower chamber 43 of the idling control cylinder by means of the tube 69, suitable couplings 70 and 71 being provided therefor.

In order that the operation and function of the aspirators E and F may be understood, it is necessary to explain the varying conditions established within the intake passage between the engine and the throttle. It is to be understood that the theory now to be set forth is the most logical and apparently correct explanation of which I am now aware.

An internal combustion engine having an intake passage in which there is a throttle for varying the quantity of explosive mixture supplied to the engine by the carburetor may be said to operate under at least three different conditions:

(1) The first may be full load conditions or more clearly defined as that condition which exists when the maximum quantity of explosive mixture is being supplied to the engine by a wide open throttle.

(2) The second may be the maximum torque condition, or in other words that condition which exists when the engine is operating at full capacity at less than full speed.

(3) The third may be called a light load condition defined as that condition which exists when the engine is operating under less pressure (within the intake passage) than occurs when the engine is operating at full throttle and normal load; also idling condition when the pressure in said passage is about 15" Hg.

Under the condition numbered (1) of full load, the manifold vacuum for a given engine may be 3" Hg, or 40" H₂O. Under the maximum torque condition numbered (2), the manifold vacuum would range from 0" Hg, to 3" Hg, depending on the speed of the engine.

It is necessary also to understand the characteristics of an aspirator with reference to the pressures induced by the velocity of the flow of air therethrough. For instance, the velocity of flow through a given venturi will induce vacuums in a definite ratio until a critical point is reached wherein the quantity of air flowing decreases rapidly in proportion to the head-promoting flow and the induced vacuum is not increased to any substantial degree.

Since the aspirator E is connected into the air sleeve 2, and assuming that the engine is operating under full load, then the head-promoting flow through the aspirator would be substantially 3" Hg. For a given aspirator the pressure of aspiration induced or occurring in annular passage 52 may be 12" Hg, if it is not modified in any manner. Now if this induced pressure of aspiration of aspirator E is utilized to operate the other aspirator F, the resultant induced pressure of aspiration in the passage 56 will exceed 12" Hg" but very little, as the capacity of an aspirator to boost the vacuum is limited substantially to pressures of aspiration when the velocity of flow through the throat of said aspirator does not exceed critical proportions. The reason that aspirator F does not act as a booster to any appreciable extent is due to the fact that velocity of air through its throat is critical. However, the resultant pressure of the two stages of aspiration is greater than a single stage so long as the boosting effect is not hindered by critical velocity conditions, or low frequency of pulsation.

An internal combustion engine will run satisfactorily with an advanced spark under a wide variet of speeds and loads which produce considerable variation in the vacuum in the intake manifold. It is therefore desirable, in any timer control means controlled by pressures existing in said intake passage at a point between the engine and the throttle, that means be provided whereby the said timer control means will not respond directly to changes in the intake manifold vacuum. It is also desirable that such means decrease the effect of the high vacuums on the spark position, which occur under light load conditions as such vacuum increases. It is also desirable that such a means should be responsive to speed characteristics; that is, said means should decrease the corresponding high vacuum less and less as the speed of the engine increases. On the other hand, said means should not decrease at all the low vacuum, but instead should amplify any low vacuum condition.

To accomplish these results is the function of the aspirator E which discharges into the intake passage 2 at a point between the engine and the throttle 3. Such an aspirator will boost the vacuum induced in chamber 52 several times over that in the intake passage 2 until such vacuum pressure is sufficient to produce critical velocity conditions. Therefore, the timer controller C responds directly to vacuum changes in the intake passage 2 until light load conditions begin to appear. As the light load conditions increase, the vacuum increases and the velocity of flow through the throat of aspirator E becomes more and more critical; in other words, the relative increment of the pressure of aspiration decreases as the velocity increases, hence the spark controller does not advance the spark to the same degree, which is desirable under the load conditions.

There is another factor which affects the operation of the aspirator. The pressure in an intake passage of an engine pulsates at a frequency corresponding to the frequency of the intake of charges by the various cylinders. The aspirator E which discharges into an intake conduit is affected by such pulsations in the respect that as the frequency of the pulsations increases, the aspirator will function more efficiently and thereby increase the induced vacuum of aspiration. As a consequence, the increased vacuum will give additional advance of the spark for a given pressure condition in the intake manifold. With the two stages of aspiration E and F, the effect of frequency of pulsation to advance the spark is increased.

Under idling conditions with low frequency of pulsations, the pressure of aspiration induced in chamber 52 of aspirator E may be about 18" Hg, when the vacuum in the manifold is 15" Hg. However, with the two stages of aspiration E and F, the resultant pressure in passage 56 may be 15" Hg, or even less. This is due to the fact that an aspirator is controlled by two forces, namely, velocity of flow, and frequency of pulsation. Thus the effect of frequency of pulsation may be amplified by two or more stages of aspiration. The flow through the aspirators will reach the maximum at an intermediate speed of engine operation and light load condition. Under this condition, the vacuum in the intake passage between the engine and the throttle may be high as well as the frequency of pulsations, hence the maximum advance of the spark occurs as result of high vacuum and high frequency of pulsation.

Under full load conditions, the frequency of pulsation will be at the maximum and the vacuum in the manifold will be only about 3" Hg; therefore, the pressure of aspiration will be substantially 12" Hg, and as a result the spark advance will be less than the maximum advance occurring under light loads at lower speeds, as above explained. This is the desirable positioning of the spark for greatest economy and long life of the engine.

In the drawing the parts are illustrated in the position which they assume when the engine is not running. When the timer control means includes a centrifugal governor or similar element for advancing the spark as the speed of the engine increases, I do not use the metering valve G, hence the needle valve 63 is closed, thus preventing the pressure occurring in the intake passage on the atmospheric side of the throttle from controlling the spark advance, except as it affects the functioning of the idle controller.

When the engine begins to run, there occurs a flow of air through the throat of the aspirator E, and this air flow induces a pressure drop within the cylinder chamber 35 of the idle controller and cylinder chamber 26 of the spark controller C. The vacuum thus established in the control C moves the piston 22 to the left in opposition to spring 27 until equilibrium of forces is established, thus advancing the spark the corresponding degree.

The idling controller valve member 31 also responds to the decreased pressure in chamber 35 and rises in the cylinder to such an extent that the annular passage 60 opens, in whole or in part, the ports 58 and 59, permitting the air to flow through throat of aspirator E, thereby controlling the spark advance by the two stages of aspiration E and F. Under this idling condition it is desirable to subject the spark control of cylinder C to a pressure substantially atmospheric, causing the spring 27 to move the piston 22 to the right, thereby retarding the spark.

The high vacuum occurring during near idling conditions in the chamber 35 of the idling controller, due to the effect of both aspirators E and F, raises the valve member 31 still higher, thereby closing ports 58 and 59, rendering aspirator E inactive, and in consequence the groove 44 rises to a point slightly below the port 41. As the pressure drop in chamber 35 approaches that pressure of idling condition in the engine manifold, the idling controller valve 31 continues to rise until it covers both ports 41 and 42, thus cutting off spark control C from chamber 35. At the same time, groove 44 opens port 41 to communication with chamber 43 through the port 45, and subjects the spark control C to the pressure in chamber 43. This pressure is never more than enough to produce a slight response of spark control C with the throttle in idling position, hence the spark remains retarded until conditions change in the manifold 2. Changes in these conditions are brought about when the throttle is opened, thus reducing the vacuum in the manifold, causing a corresponding reduction in the vacuum in chamber 35, thereby allowing spring 32 to recede the valve 31. This opens port 42 to chamber 35 and subjects the spark control C to the pressure in chamber 35, causing it to advance the spark.

While it is not necessary, I prefer that idling controller D be subjected to a differential pressure which decreases as the speed of the engine increases, and that said differential pressure be modified by a pressure brought about by the increase in the quantity of charge supplied to the engine to increase the speed of the engine. In addition, I prefer that this modifying pressure be amplified by the process of aspiration. The purpose of this modified differential pressure is to render the spark control subject to the quantity of charge supplied to the engine as a factor determining the most effective position of the spark. These results are accomplished by the use of the aspirator H which is affected by the pressure drop occurring in the carburetor 2 at a point between the throttle 3 and the air intake of said carburetor. Amplification of this pressure drop is desirable and is accomplished by employing the venturi 6 as the flow-impeding means.

As the engine passes through the idling condition by the opening of the throttle 3 to increase the speed and permit an increase in full charge to the engine, the vacuum in the manifold decreases and a greater quantity of air flows through the intake end of the carburetor. This increase in air flow through the flow-impeding venturi increases and induces pressure drop in chamber 65 which in turn increases the action of aspirator H to produce a greater vacuum in chamber 67. This amplified pressure drop in chamber 67 is established in chamber 43 of the idling controller and subjects the valve 31 to a differential pressure with relation to that in the chamber 35. The effect is to cause the valve 31, under action of spring 32, to restore to its lower position, and, by opening ports 41 and 42, establish whatever pressure exists in chamber 35 in the spark control C, thus causing the spark to advance the corresponding degree. Thus the volume or quantity of charge to the engine is a factor in determining the position of the spark.

The means for controlling time of ignition in an internal combustion engine has been described in connection with the actuation of a timer of usual construction which includes a centrifugal governor for automatically varying the time of ignition in accordance with the speed of the engine. As set forth, previously, it is an object of this invention to eliminate all engine driven connections with the timer for varying ignition timing. This is accomplished by the adjustment of the screws 63, 34 and 28.

Opening the adjusting screw 63 of the metering valve G subjects the timer control C to two influences, namely: the load on the engine as determined by pressures of aspiration controlled by the intake suction existing between the engine and the throttle; and speed of the engine as determined by the quantity of explosive mixture which is being supplied to the engine as above described. The result is improved co-ordination between the two influences, speed and load, because a mechanical speed governor tends to give additional advance of the spark at a time when a light load condition would produce excessive advance of the spark, due to high vacuum occurring during light load conditions. By opening the metering valve 63, the characteristic of the pressure curve, within the spark controller C, will change, and in addition the respective values of decreased pressure (vacuum) will decrease. Therefore, it will be necessary to proportionately decrease the action of spring 27 on piston 22.

Obviously, it will also be necessary to adjust the load of spring 32 which controls the functioning of idling valve 31. It is to be understood that the pressure in chamber 35 will always be less than the pressure in chamber 43, when the throttle 3 is in idling position, a result of decreased pressure of aspiration of aspirator F. If the engine is operating at full throttle under normal load, the pressure in the respective chambers 35 and 43 may be substantially the same, due to the fact that metering valve G being open, connects chamber 43 with chamber 52 of aspirator E. This is as it should be, so that the idling controller will function only at idling speed. In the structures shown in the drawing, the differential pressure required to operate the idling controller ordinarily will not occur at any time that the engine is actually working.

The metering valve may, if desired, be made automatic in its operation, as shown in Fig. 2. Instead of metering valve G, the structure J shown in Fig. 2 is connected in the line 69 between aspirator H and the idling controller cylinder chamber 43. This metering valve J has a cylinder 75 having a chamber 76 subject to vacuum conditions in the line 69, and a piston 77 movable in said cylinder in response to said vacuum conditions. The other end of the cylinder is open to the atmosphere through port 78. The piston carries a needle valve member 79 which cooperates with the end of tube 80 to control the flow of air through the cylinder. The cylinder contains a spring 81 which opposes the action of the piston, and the tube 80 is carried by a screw 82 which is provided for adjusting the tube with respect to the needle. Communication between the tube 80 and the passage 69 is established through the ports 83 in the tube. Thus the flow of air through passage 69 is decreased by needle valve 79 as the piston 77 responds to increased vacuum established in cylinder chamber 76.

My device thus operates without mechanical connection to any moving part of the carburetor or associated mechanism and its installation is thereby facilitated. Regulation of the spark occurs as a result of the joint effect of pressures of aspiration at two points spaced along the intake conduit of the engine. The proportionate part which each pressure plays in the ultimate control of the timing of the ignition varies with changes in the pressures; the relative effect of the pressure decreasing as critical velocity conditions increase. The pressure in the intake conduit at which critical velocity conditions appear may be controlled in part by the use of a series of aspirators. Aspirators may be used to increase the vacuum existing in the intake conduit, or may be used to affect restriction of air flow through a passage to modify timing of the ignition in a manner equivalent to a pressure controlled metering valve as shown in Fig. 2. My method of decreasing the effect of high vacuums as such vacuums increase, operates without mechanical movement.

It is obvious that changes may be made in the construction, operation and arrangement of the parts without departing from the scope and spirit of the invention, and I contemplate such changes as fairly come within the scope of the appended claims.

I claim:

1. In combination with an internal combustion engine having a cylinder and an intake passage leading thereto, a throttle in said intake passage, means for timing the igniting of the charge in said cylinder, and timer-regulating means controlled by the decreased pressure induced by the velocity of a column of air flowing into said intake passage between the engine and said throttle, the velocity of which is controlled by the intake suction existing in said intake passage between the engine and said throttle.

2. The combination of an internal combustion engine having a cylinder and an intake passage leading thereto, a throttle in said intake passage, an aspirator controlled by decreased pressure existing in said intake passage between the engine and said throttle, means for timing the igniting of the charge in said cylinder, and timer-regulating means controlled by the decreased pressure induced by the velocity of a column of air through said aspirator, the velocity of which is controlled by the decreased pressure in said intake passage.

3. The combination of an internal combustion engine having a cylinder and an intake passage leading thereto, a throttle in said intake passage, said intake passage being provided between the engine and said throttle with means including an aspirator open to atmosphere and discharging into said passage, for producing pressures of aspiration in accordance with the decreased pressure existing in said passage between the engine and said throttle, said intake passage also being provided between the inlet thereof and said throttle with means for producing pressures of aspiration in accordance with the decreased pressure existing in said passage between the inlet and throttle, means for timing the igniting of the charge in said cylinder, and time-regulating means controlled jointly by said pressures of aspiration produced respectively between the engine and said throttle and between the inlet of said intake passage and said throttle.

4. The combination of an internal combustion engine having a cylinder and an intake passage leading thereto, a throttle in said intake passage, an aspirator discharging gases into said intake passage at a point between the engine and said throttle, an additional aspirator connected with and controlled by pressures of aspiration of said first named aspirator, timer means for timing the igniting of the charge in said cylinder controlled by decreased pressure of aspiration of said additional aspirator, and means for modifying the action of said timer means on the timing of the igniting of the charge in said cylinder in accordance with the pressure conditions existing between the inlet of said intake passage and said throttle.

5. The combination of an internal combustion engine having a cylinder and an intake passage leading thereto, a throttle in said intake passage, an aspirator discharging gases into said intake passage at a point between the engine and said throttle, an additional aspirator connected with and controlled by pressures of aspiration of first named aspirator, means for timing the igniting of the charge in said cylinder controlled by decreased pressures of aspiration of said additional aspirator, and means for modifying the velocity of flow through said additional aspirator in accordance with the fluid pressure conditions existing between the inlet of said intake passage and said throttle.

6. The combination of an internal combustion engine having a cylinder and an intake passage leading thereto, a throttle in said intake passage, means for automatically varying the timing of igniting of the charge in said cylinder in accordance with decreased pressures in said intake passage between the engine and said throttle, an aspirator open to atmosphere and discharging into said intake passage between the engine and the throttle for controlling the pressure in said intake passage, and means for automatically varying the timing of the igniting of the charge in said cylinder in accordance with the speed of the engine.

7. The combination of an internal combustion engine having a cylinder and an intake passage leading thereto, ignition means for said cylinder, a throttle in said passage, a centrifugally operated device for operating said ignition to advance the timing of the ignition with increase in speed of the engine, and automatic means operating independently thereof and co-acting therewith to adjust the timing of the ignition means according to different power requirements on the engine, said automatic means including an aspirator open to atmosphere and discharging into said intake passage between the engine and the throttle and responsive to pressure conditions existing in said intake passage between the engine and said throttle.

8. The combination with an internal combustion engine having a cylinder and an intake passage leading thereto, a throttle in said intake passage, means for automatically varying the timing of the igniting of the charge in said cylinder, said means including an aspirator open to atmosphere and discharging into said intake passage and responsive to decreased pressures existing in said intake passage between the engine and said throttle, and centrifugally operated means for automatically varying the timing of the igniting of the charge in said cylinder in accordance with the speed of the engine.

9. In combination, an internal combustion engine having a cylinder and an intake passage leading thereto, an aspirator normally discharging gases into said intake passage, means for timing the igniting of the charge in said cylinder, means controlled by decreased pressures of aspiration produced by said aspirator, and means for rendering said aspirator inoperative to discharge gases into said intake passage until a predetermined pressure drop occurs in said intake passage.

10. In combination, an internal combustion engine having a cylinder and intake passage leading thereto, a throttle in said passage, an aspirator normally discharging gases into said intake passage between the engine and said throttle, means for igniting the charge in said cylinder controlled by decreased pressures of aspiration produced by said aspirator, and means for rendering said aspirator inoperative to discharge gases into said intake passage until a predetermined pressure drop occurs in said intake passage between the engine and said throttle.

11. In combination, an internal combustion engine having a cylinder and an intake passage leading thereto, a throttle in said intake passage, an aspirator discharging gases into said intake passage between the engine and said throttle, an additional aspirator controlled by pressures of aspiration of first named aspirator, means for timing the igniting of the charge in said cylinder controlled by decreased pressures of aspiration of said additional aspirator, and means for rendering the first named aspirator inoperative to discharge gases into the intake passage preparatory to rendering said ignition timing means inoperative to advance the time of ignition while a predetermined pressure drop exists in the intake passage between the engine and said throttle.

12. In combination, an internal combustion engine having a cylinder and an intake passage leading thereto, a throttle in said passage, means for timing the igniting of the charge in said cylinder controlled by decreased pressures existing between the engine and said throttle, and means for rendering said ignition means inoperative to advance the spark, said means including a pressure responsive element subjected on one side to fluid pressure in said intake passage between the engine and said throttle, and on its other side to fluid pressure in said intake passage between the inlet thereof and said throttle.

13. In combination with an internal combustion engine having a cylinder and an intake passage leading thereto, a throttle in said passage, ignition means for igniting the charge in the cylinder, means for timing the igniting of the charge in said cylinder in accordance with decreased pressures of aspiration, said means including an aspirator discharging into and controlled by fluid pressure conditions existing in said intake passage between the engine and said throttle, an aspirator open to atmosphere and discharging into said intake passage between the inlet and the throttle, and means for rendering said ignition timing means inoperative to advance the spark controlled by pressures equal to the difference between the pressures occurring in said intake passage between the engine and said throttle and the pressures of aspiration existing in said intake passage between the inlet thereof and said throttle.

14. The combination of an internal combustion engine having a cylinder and an intake passage leading thereto, a throttle in said intake passage, an aspirator discharging gases through a restricted passage into said intake passage at a point between the engine and said throttle, means for timing the igniting of the charge in said cylinder, and timer-regulating means controlled by pressures of aspiration induced by said aspirator.

15. The combination of an internal combustion engine having a cylinder and an intake passage leading thereto, a throttle in said intake passage, an aspirator discharging gases through a restricted passage into said intake passage at a point between the engine and said throttle, means for timing the igniting of the charge in said cylinder, timer-regulating means controlled by pressures of aspiration induced by said aspirator, and means for modifying the pressure between the throat of said aspirator and said restricted passage in accordance with the pressure conditions existing in said intake passage between the inlet thereof and said throttle.

16. The combination of an internal combustion engine having a cylinder and an intake passage leading thereto, a throttle in said intake passage, an aspirator discharging gases through a restricted passage into said intake passage at a point between the engine and said throttle, means for timing the igniting of the charge in said cylinder, timer-regulating means controlled by pressures of aspiration induced by said aspirator, means for modifying the pressure between the throat of said aspirator and said restricted passage in accordance with the pressure conditions existing in said intake passage between the inlet thereof and said throttle, said modifying means including an aspirator discharging into said intake passage between the inlet thereof and said throttle, and a restriction for controlling action of the modifying means.

17. The combination of an internal combustion engine having a cylinder and an intake passage leading thereto, a throttle in said intake passage, an aspirator discharging gases into said intake passage at a point between the engine and said throttle, means for timing the igniting of the charge in said cylinder, and timer-regulating means controlled differentially by the pressure existing in said intake passage at a point between the engine and said throttle, and the pressure of aspiration induced by said aspirator.

18. In combination, an internal combustion engine having a cylinder and an intake passage leading thereto, a throttle in said passage, timing means for normally timing the igniting of the charge in said cylinder in accordance with decreased pressures of aspiration induced by an aspirator open to the atmosphere and discharging into said intake passage between the engine and said throttle, and idling means responsive to a predetermined drop in pressure induced in said intake passage between the engine and the throttle by said aspirator, for rendering said timing means responsive to pressure conditions in the passage between the inlet and the throttle.

19. The combination of an internal combustion engine having a cylinder and an intake passage leading thereto, a throttle in said passage, an aspirator open to atmosphere and discharging into said passage at a point between the engine and said throttle, an additional aspirator discharging through and controlled by said first-mentioned aspirator, and means for timing the igniting of the charge in said cylinder controlled by the pressure induced by said aspirators.

20. In combination with an internal combustion engine having a cylinder and an intake passage leading thereto, a throttle in said intake passage, means for normally timing the igniting of the charge in said cylinder in accordance with the decreased pressure existing in said intake passage between the engine and said throttle, and means for rendering said ignition means inoperative to advance the time of ignition under predetermined conditions comprising a pressure-responsive element controlled by the decreased pressure induced by an aspirator open to the atmosphere and discharging into said intake passage at a point between the engine and said throttle, said pressure-responsive element rendering said ignition timing means inoperative to advance the time of ignition when the decreased pressure induced by said aspirator reaches or drops below a predetermined value.

HAROLD W. MEADE.